(12) United States Patent
Warren

(10) Patent No.: US 6,910,300 B1
(45) Date of Patent: Jun. 28, 2005

(54) YARD PEST BAIT STATION

(76) Inventor: Marshall H. Warren, 2040 Straw Pond School Rd., Roseboro, NC (US) 28382

( * ) Notice: Subject to any disclaimer, the term of this patent is extended or adjusted under 35 U.S.C. 154(b) by 47 days.

(21) Appl. No.: 10/602,257

(22) Filed: Jun. 23, 2003

(51) Int. Cl.[7] .............................................. A01M 25/00
(52) U.S. Cl. ...................................................... 43/131
(58) Field of Search ................................... 43/131, 124

(56) References Cited

U.S. PATENT DOCUMENTS

| | | | | |
|---|---|---|---|---|
| 835,357 | A | * 11/1906 | Janeway ........................ | 43/124 |
| 1,302,160 | A | * 4/1919 | Hedrich et al. ................ | 43/131 |
| 1,443,287 | A | * 1/1923 | Snyder et al. ................. | 43/131 |
| 1,579,512 | A | * 4/1926 | Bushong ....................... | 43/131 |
| 1,633,982 | A | * 6/1927 | Davis ............................ | 43/131 |
| 2,480,724 | A | * 8/1949 | Feussner ....................... | 43/131 |
| 2,860,445 | A | * 11/1958 | Yates ............................ | 43/131 |
| 3,122,857 | A | * 3/1964 | Yates ............................ | 43/131 |
| 3,772,820 | A | * 11/1973 | Bond ............................ | 43/131 |
| 4,364,194 | A | * 12/1982 | Clark, Sr. ..................... | 43/131 |
| 4,375,732 | A | * 3/1983 | Waast ........................... | 43/131 |
| 4,400,904 | A | * 8/1983 | Baker ........................... | 43/131 |
| 4,413,440 | A | * 11/1983 | Schultz ......................... | 43/131 |
| 4,462,182 | A | * 7/1984 | French ......................... | 43/131 |
| 4,497,131 | A | * 2/1985 | Hicks ........................... | 43/131 |
| 4,611,426 | A | * 9/1986 | Willis ........................... | 43/131 |
| 4,630,392 | A | * 12/1986 | Ferraro ......................... | 43/131 |
| 4,662,104 | A | * 5/1987 | Mather et al. ................ | 43/131 |
| 5,040,327 | A | * 8/1991 | Stack et al. ................... | 43/131 |
| 5,152,097 | A | * 10/1992 | Rhodes ......................... | 43/131 |
| 5,170,584 | A | * 12/1992 | Perry ........................... | 43/124 |
| 5,622,001 | A | * 4/1997 | Kazmierzak .................. | 43/131 |
| 5,901,496 | A | * 5/1999 | Woodruff ..................... | 43/131 |
| 5,921,018 | A | * 7/1999 | Hirose et al. ................. | 43/131 |
| 6,158,166 | A | * 12/2000 | Snell et al. ................... | 43/131 |
| 6,219,961 | B1 | * 4/2001 | Ballard et al. ................ | 43/131 |
| 6,374,536 | B1 | * 4/2002 | Washburn ..................... | 43/131 |
| 6,389,738 | B1 | * 5/2002 | Denny et al. ................. | 43/58 |
| 6,655,079 | B1 | * 12/2003 | Bernard et al. ............... | 43/131 |
| 6,729,067 | B2 | * 5/2004 | Lund et al. ................... | 43/131 |

FOREIGN PATENT DOCUMENTS

| | | | |
|---|---|---|---|
| AU | 9533181 A1 | * | 4/1996 |
| DE | 3627995 A1 | * | 3/1988 |
| DE | 3905489 A1 | * | 8/1990 |
| DE | 4134678 A1 | * | 10/1992 |
| DE | 4431694 A1 | * | 3/1996 |
| DE | 19613008 A1 | * | 11/1996 |
| DE | 19629306 A1 | * | 1/1998 |
| DE | 19758312 A1 | * | 7/1999 |
| DE | 10208138 A1 | * | 9/2003 |
| EP | 1234502 A2 | * | 8/2002 |
| FR | 2232991 A1 | * | 2/1975 |
| FR | 2750573 A1 | * | 7/1996 |

(Continued)

OTHER PUBLICATIONS

One page bearing information copied from a box of Rozol ®, pellets, date unknown.*

Seven page printout from Ministry of Agriculture and Food of Ontario, Canada; Published Jun. 1998 by Ken R. Wilson, p. four.*

*Primary Examiner*—Darren W. Ark

(57) ABSTRACT

A bait station is provided for common yard and garden pests such as voles, mice or the like. The pest station includes a tubular pest channel to which a bait tube is normally mounted. A cap affixed at the terminal end of the bait tube prevents moisture and light from entering the bait tube and allows quick removal for easy monitoring and bait replenishment. An anchor is affixed to the bait tube to maintain the bait station in a rigid fixed position on the ground. A flexible shroud having a central opening is used in combination with the bait tube and allows the application of pine needles or other ground cover for presenting the bait station in a more natural environment and provides hidden entry to approaching pests.

11 Claims, 5 Drawing Sheets

FOREIGN PATENT DOCUMENTS

| | | | | |
|---|---|---|---|---|
| GB | 2023987 A1 * | 1/1980 | | |
| GB | 2096446 A1 * | 10/1982 | | |
| GB | 2249249 A1 * | 5/1992 | | |
| GB | 2384966 A1 * | 8/2003 | | |
| JP | 2001-25349 B1 * | 1/2001 | | |
| WO | WO-82-03968 A1 * | 11/1982 | | |
| WO | WO-86/02806 A1 * | 5/1986 | | 43/131 |

* cited by examiner

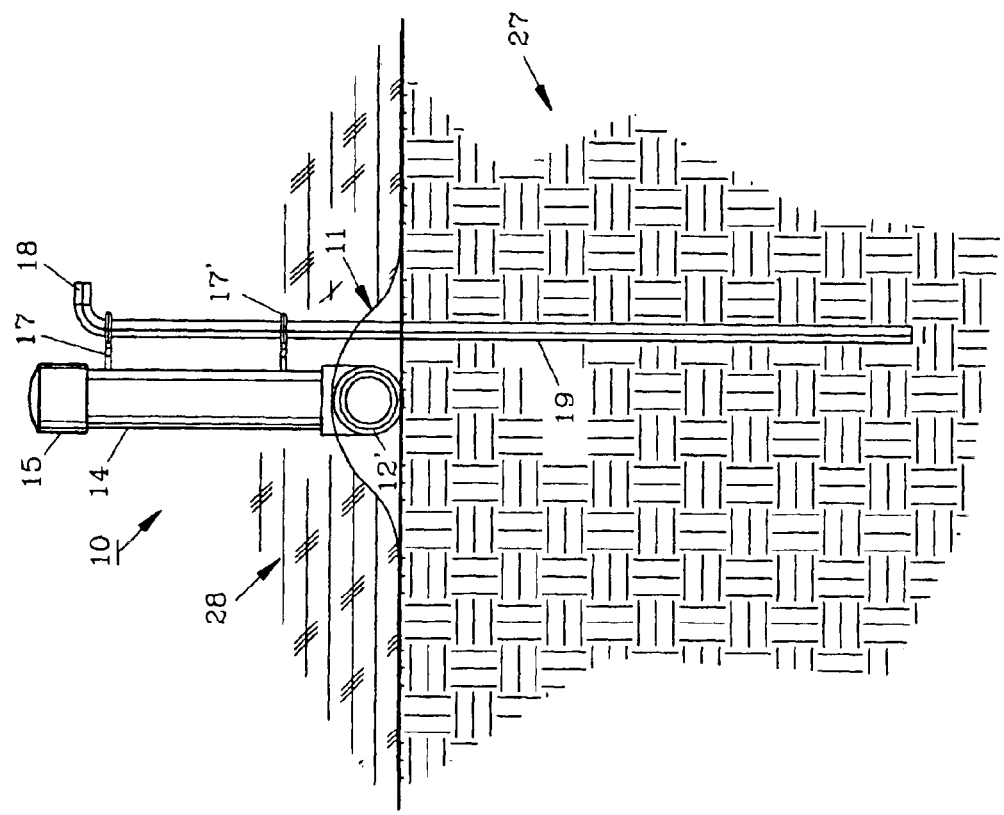

YARD PEST BAIT STATION

FIELD OF THE INVENTION

The invention herein pertains to pest eradication and particularly pertains to the eradication of voles, mice and other pests which thrive in yards and gardens.

DESCRIPTION OF THE PRIOR ART AND OBJECTIVES OF THE INVENTION

Landscapers, home owners and others are often confronted with shrubs, bushes and other plants that are under siege by yard and garden pests such as voles. Voles reside in fields, forests, lawn and shrub habitats and damage plants by feeding on their roots and stems. It is not unusual for small trees, bushes, perennials and other plants to be severed from their roots thus, quickly killing the plant and requiring it to be replaced, usually at a large expense. Some of the most devastating pests to plants are varieties of voles known as pine and meadow voles. Unlike certain mammals, voles do not hibernate and are active throughout the-year. They have the ability to rapidly reproduce and can quickly populate a lawn or garden causing homeowners, landscapers and others much concern and work.

While several manufacturers build pest bait stations, such as "open" T-bait stations for mice, traps and the like, many of the prior stations and traps are expensive to manufacture and purchase. Other common bait stations do not have a natural, "hidden" appearance and frighten pests, thereby deterring pest approaches and making the stations somewhat ineffective.

Thus in view of the disadvantages and problems associated with current pest bait stations the present invention was conceived and one of its objectives is to provide a relatively inexpensive bait station which can be quickly installed and operated.

It is another objective of the present invention to provide a pest bait station which can be easily stabilized near a pest burrow or runway with a metal anchor.

It is still another objective of the present invention to provide a pest bait station which will allow entry of two pests simultaneously.

It is also an objective of the present invention to provide a pest bait station which can be easily loaded with bait without moving or disturbing its location.

It is a further objective of the present invention to provide a pest bait station which presents a natural, hidden appearance through the use of a shroud for receiving ground cover.

It is yet another objective of the present invention to provide a pest bait station which utilizes conventional bait in pellet form for ease and convenience while refilling.

Various other objectives and advantages of the present invention will become apparent to those skilled in the art as a more detailed description is set forth below.

SUMMARY OF THE INVENTION

The aforesaid and other objectives are realized by providing an inverted t-shaped tubular bait station having a covered horizontal pest channel to which a vertical bait tube is affixed. Both the pest channel and the bait tube are hollow to allow communication therebetween. The bait tube extends upwardly from the pest channel, having a cap which upon removal allows bait, such as conventional pellets to be poured therein for delivery to the pest channel for consumption by pests. First and second eye bolt guides are affixed to the bait tube for reception of an anchor inserted therethrough to stabilize and maintain the bait station in a desired posture during use. A thin, flexible polymeric shroud is provided which preferably can be placed over the horizontal pest channel of the bait station by utilizing a central opening within which passes over the bait tube or channel. Mulch, pine needles or other ground cover can be placed atop the shroud to create a "natural" appearance to prevent frightening of approaching pests. Once the bait station is in place, pests can then enter the pest channel beneath the shroud and ground cover, consume bait and return to their nests or other location. As the bait has a slow, toxic effect, the pests are eradicated over a period of time without awareness of the actual cause. Bait is added by the user on a continuous basis as needed until the pests are eradicated.

BRIEF DESCRIPTION OF THE DRAWINGS

FIG. 3 provides a rear elevational view of the bait station as shown in FIG. 2 with the shroud as mounted in the ground;

DETAILED DESCRIPTION OF THE PREFERRED EMBODIMENT AND OPERATION OF THE INVENTION

Figure 1:
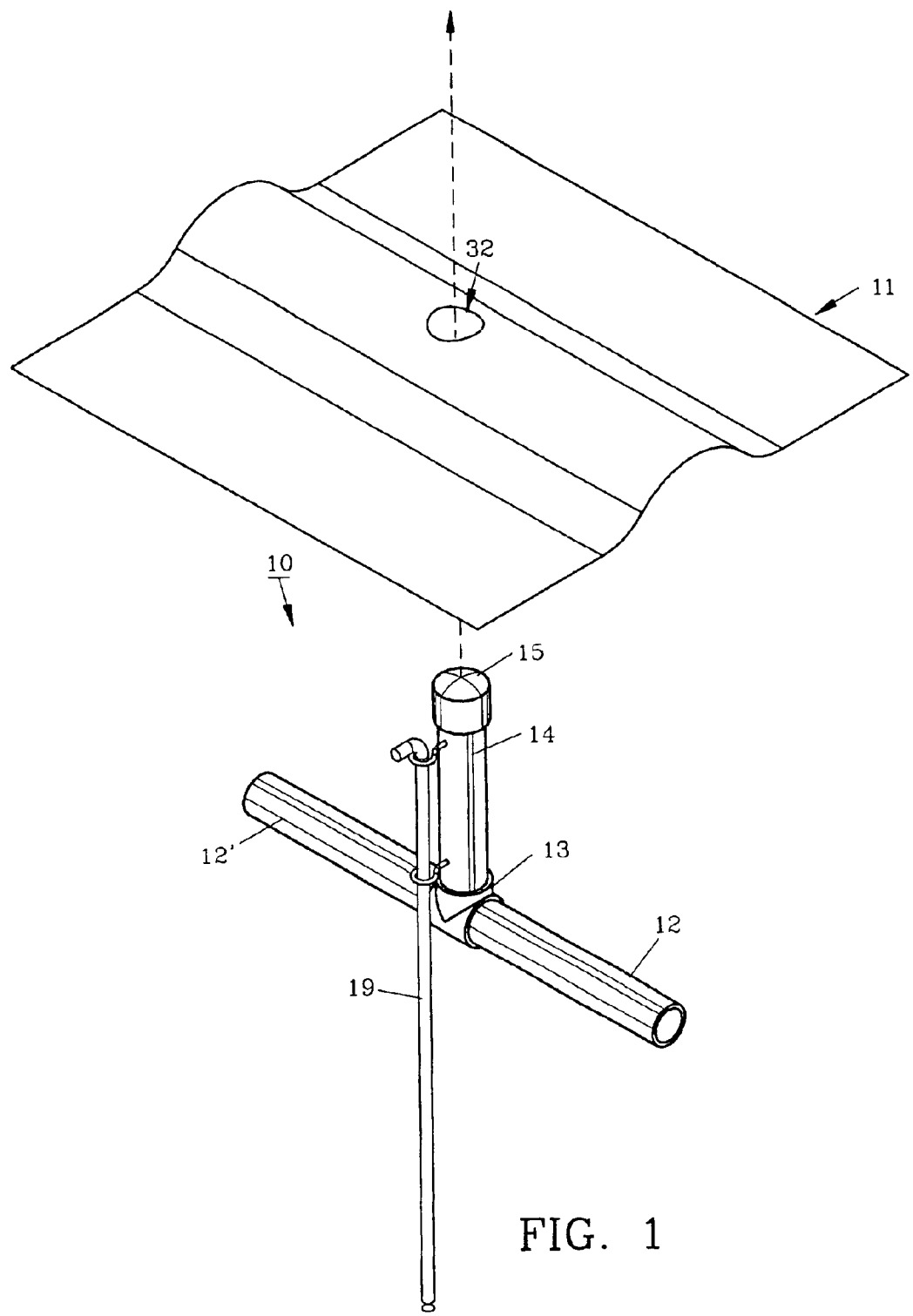
FIG. 1 is a perspective view of the bait station with the shroud removed for clarity.
Figure 6:
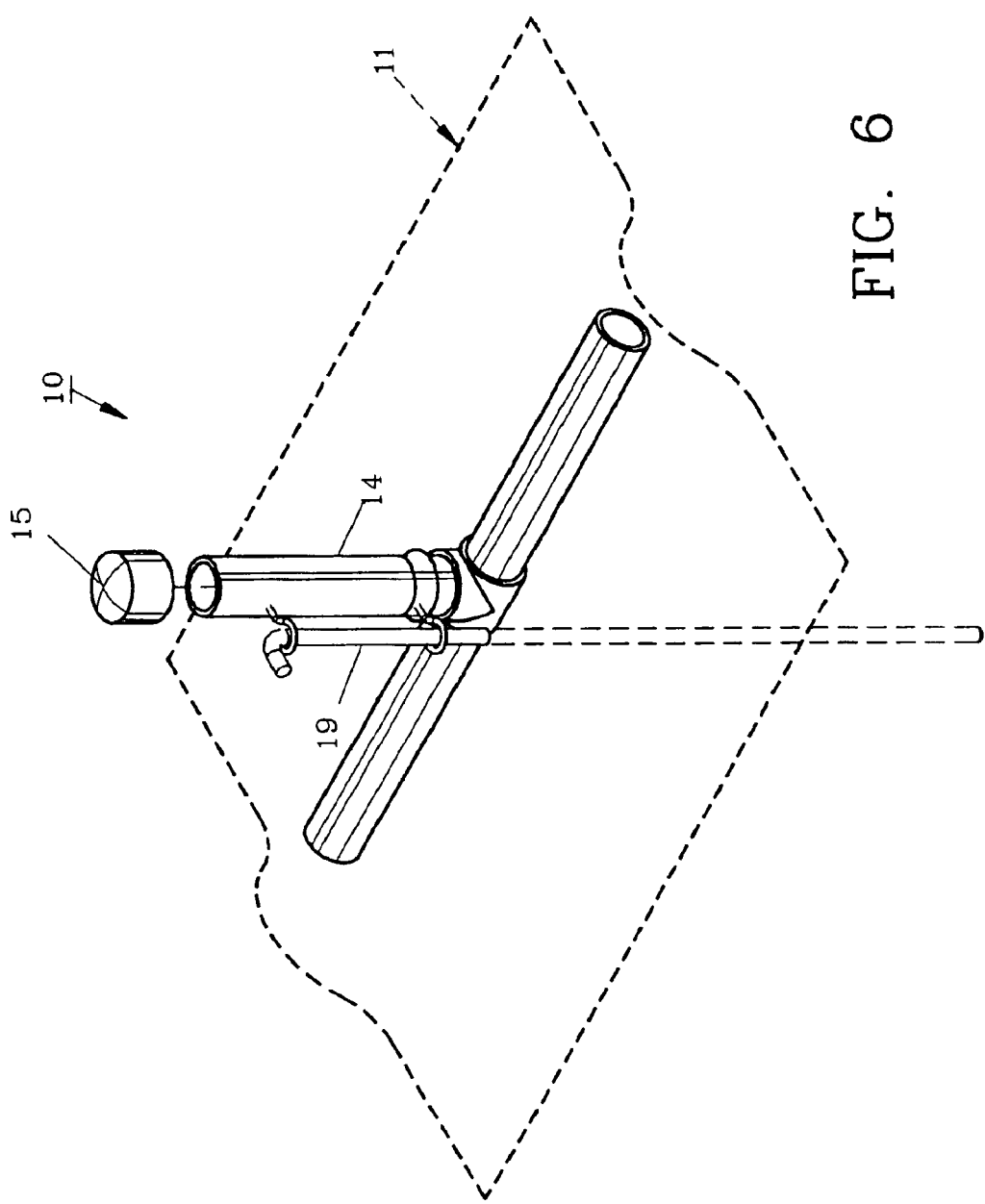
FIG. 6 depicts a perspective view of the bait station with the anchor in the ground, with the shroud in ghost form and the bait tube cap removed therefrom.

For a better understanding of the invention and its operation, turning now to the drawings, FIG. 1 illustrates in perspective fashion preferred pest bait station 10 with shroud 11 exploded therefrom. Pest bait station 10 includes pest channels 12, 12', consisting of tubular members for simultaneous entry of two (2) pests, one in each channel, t-joint 13 and bait tube 14, preferably all formed from plastics, such as standard PVC pipe. Pest channels 12, 12' and bait tube 14 each have an inner diameter of preferably 1.25 inches (3.18 cm) although other diameters may be used. Cap 15 is shown in FIG. 6 exploded from bait tube 14 and is releasably positioned thereon to prevent rain or the like from entering bait tube 14 while allowing removal for bait replenishment. While plastic is the preferred material of construction, aluminum may also be used, but is not preferred. While pest channels 12, 12', bait tube 14 and t-joint 13 are shown as separate members, all could be formed simultaneously by molding as a single unit.

Anchor guides 17, 17' are attached to bait tube 14 as shown in FIG. 3. Anchor guides 17, 17' are preferably standard eye bolts which allow anchor 19 to be attached to bait tube 14. Other types or forms of anchor guides may be used and may be integrally formed with bait tube 14. Anchor 19 is preferably 0.375 inches (0.97 cm) in diameter and 24 inches (60.9 cm) in length, and made from steel, though other lengths, diameters and materials may be used depending on the nature (density) of the soil and the exact location selected.

Shroud 11 as shown in FIGS. 1, 3 and 6, is seen unfolded and central opening 32 is placed over cap 15 of bait tube 14 as shown in FIG. 1. Shroud 11 is then smoothed along the ground surface which it contacts and is then covered with mulch, pine needles 28 (FIG. 3) or the like to provide a camouflage and a more natural appearance. Shroud 11 is preferably formed from black, polyethylene sheeting having a six(6) to ten(10) mil thickness, but other durable, flexible materials may be used.

Pest station 10 can be monitored by sliding cap 15 off bait tube 14 to view any bait 30 which remains therein. Once bait 30 has been totally consumed, additional bait 30 can be added by placing it in bait tube 14, until such time as no bait 30 is further consumed for approximately thirty (30) days. Thereafter pest station 10 can be removed and placed at another site in the homeowner's yard or garden. To remove or relocate pest station 10 the steps of installation are reversed, i.e., shroud 11 is first removed and thereafter, anchor 19 is withdrawn by manually pulling end 18 upwardly and removing anchor 19 from ground 27. Pest station 10 is then free to be moved to another suitable location and reinstalled for further pest eradication. Pest station 10 can also be installed without shroud 11 but such is not preferred.

Figure 2:
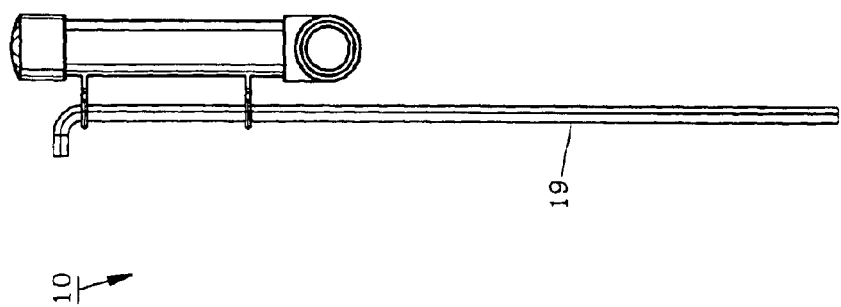
FIG. 2 demonstrates a front elevational view of the bait station of FIG. 1 with the shroud removed.
Figure 7:
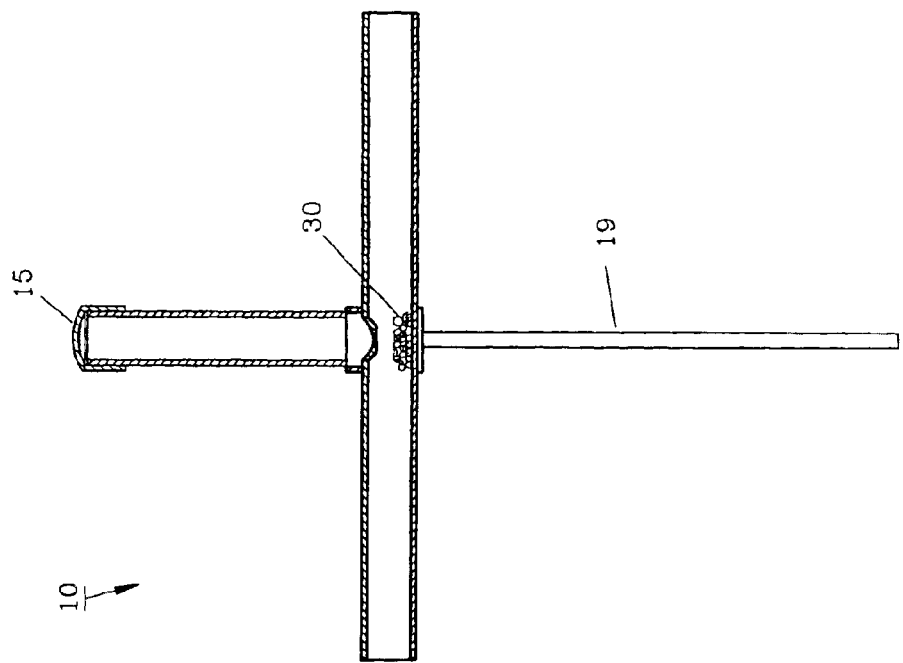
FIG. 7 illustrates a cross-sectional right side view of the bait station with bait therein.

As seen in FIGS. 2 and 3, a typical yard pest such as a vole may enter pest channels 12 (seen in FIG. 2) or 12' (FIG. 3) and proceed to bait 30 (FIG. 7). Bait 30 preferably consists of Rozol® pellets as manufactured by Lithatech, Inc. of Milwaukee, Wis. which is a trademark for Chlorophacinone-Liphadione, a conventional mouse pellet.

Figure 4:
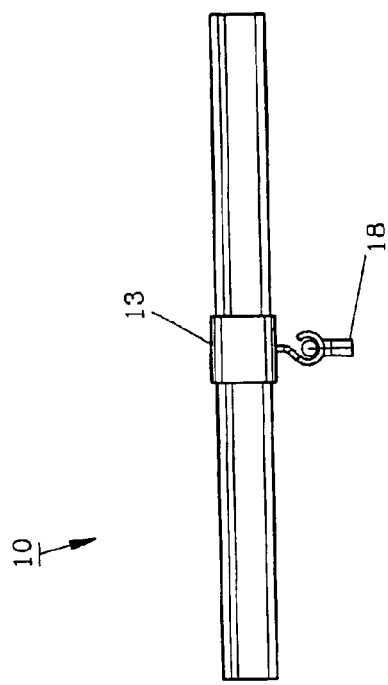
FIG. 4 features a right side elevational view of the bait station as shown in FIG. 1.
Figure 5:
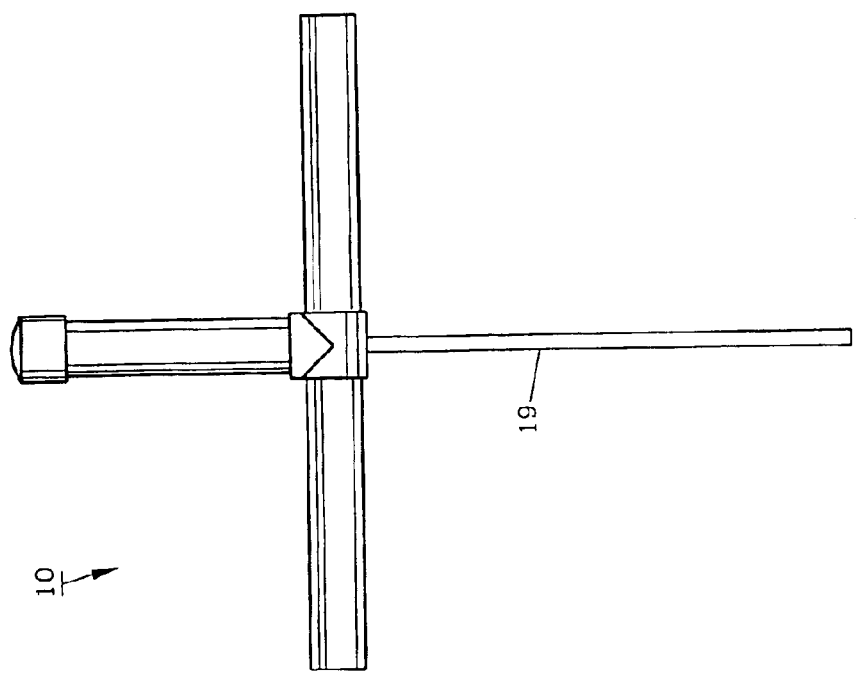
FIG. 5 shows a bottom plan view of the bait station of FIG. 4.

In the method of use, inverted t-shaped pest station 10 as shown in FIGS. 4 and 5 is placed on the ground near a known pest burrow or runway, or near shrubs and bushes that have suffered root damage due to voles or other similar pests. Anchor 19, preferably consisting of a rigid metal rod, is placed in anchor guides 17 and 17' and is then driven manually into the ground as shown for example in FIG. 3. Shroud 11 is then slid over bait tube 14 and anchor 19 and is concealed with leaves, pine needles 28 or other ground cover. Next, cap 15 is removed from bait tube 14 and a quantity of about three(3) to four(4) ounces of Rozol® is placed in bait tube 14. As bait tube 14 communicates with pest channels 12, 12', bait 30 is then available for pests entering pest channels 12, 12'. Bait 30 is then eaten or collected by pests (not seen) and taken back to the nest where bait 30 is shared with all family members to thereby eradicate such pests over time with proper monitoring and replenishment of bait 30 as needed.

The illustrations and examples provided herein are for explanatory purposes and are not intended to limit the scope of the appended claims.

I claim:

1. A bait station comprising: a horizontal pest channel, a vertical bait tube, said pest channel affixed to said bait tube and in fluid communication therewith, a flexible planar shroud, said shroud defining a central opening therein, said bait tube positioned in said shroud opening for covering the pest channel, an anchor, first and second anchor guides attached to said bait tube, said second anchor guide attached to said bait tube below said first anchor guide, said first and second anchor guides aligned along said bait tube for maintaining a common anchor, each of said first and second anchor guides comprises an eye bolt, said anchor slideable within said eye bolts, whereby said shroud can be hidden with ground cover to camouflage said bait station while said bait tube remains readily accessible and is stabilized while said pest channel remains negotiable to a pest.

2. The bait station of claim 1 wherein said shroud comprises a polymeric sheet.

3. The bait station of claim 1 wherein said anchor comprises a metal rod.

4. The bait station of claim 1 further comprising a cap, said cap positioned on said bait tube.

5. The bait station of claim 1 wherein said pest channel defines an opening at each end for pest movement therethrough.

6. The bait station of claim 1 further comprising bait, said bait contained within said pest channel.

7. The bait station of claim 6 wherein said bait comprises Chlorophacinone-Liphadione.

8. The bait station of claim 1 wherein said pest channel is tubular.

9. A method to eradicate yard pests using an inverted t-shaped bait station comprising a substantially vertical bait tube with a removable cap, the bait tube normally intersecting a pest channel and in fluid communication therewith, a flexible planar shroud with a central opening for receiving the bait tube so the shroud substantially covers the pest channel, a pair of anchor guides affixed to the bait tube along its length which are aligned with each other and are parallel to a vertical axis of the bait tube, an anchor that slideably passes through the pair of anchor guides for securing the bait station to the ground and maintaining a desired orientation, the method comprising the steps of:

a) placing the bait station on the ground whereby the pest channel contacts the ground surface and the bait tube is normal to the ground near a known pest burrow;

b) adjusting an angle of the bait tube with respect to the ground surface to achieve the desired orientation;

c) placing the anchor through the anchor guides and contacting the ground therewith;

d) placing the shroud opening over the bait tube so the pest channel is completely covered with the shroud;

e) concealing the shroud with ground cover; and f) baiting the bait station.

10. The method of claim 9 wherein baiting the bait station comprises the further steps of:

a) removing the cap from the bait tube;

b) placing a quantity of bait in the bait tube whereby the bait falls into the pest channel for consumption by pests; and c) replacing the cap on the bait tube.

11. The method of claim 9 further comprising the steps of:

a) removing the cap from the bait tube and looking therein to determine if the bait needs replenishing;

b) replenishing the bait station as necessary for eradicating additional pests; and c) relocating the bait station to another pest burrow until desired eradication has been completed.

* * * * *